April 15, 1930.  H. G. MOBLEY  1,754,641
PRESSURE RELIEF APPARATUS
Filed June 21, 1926
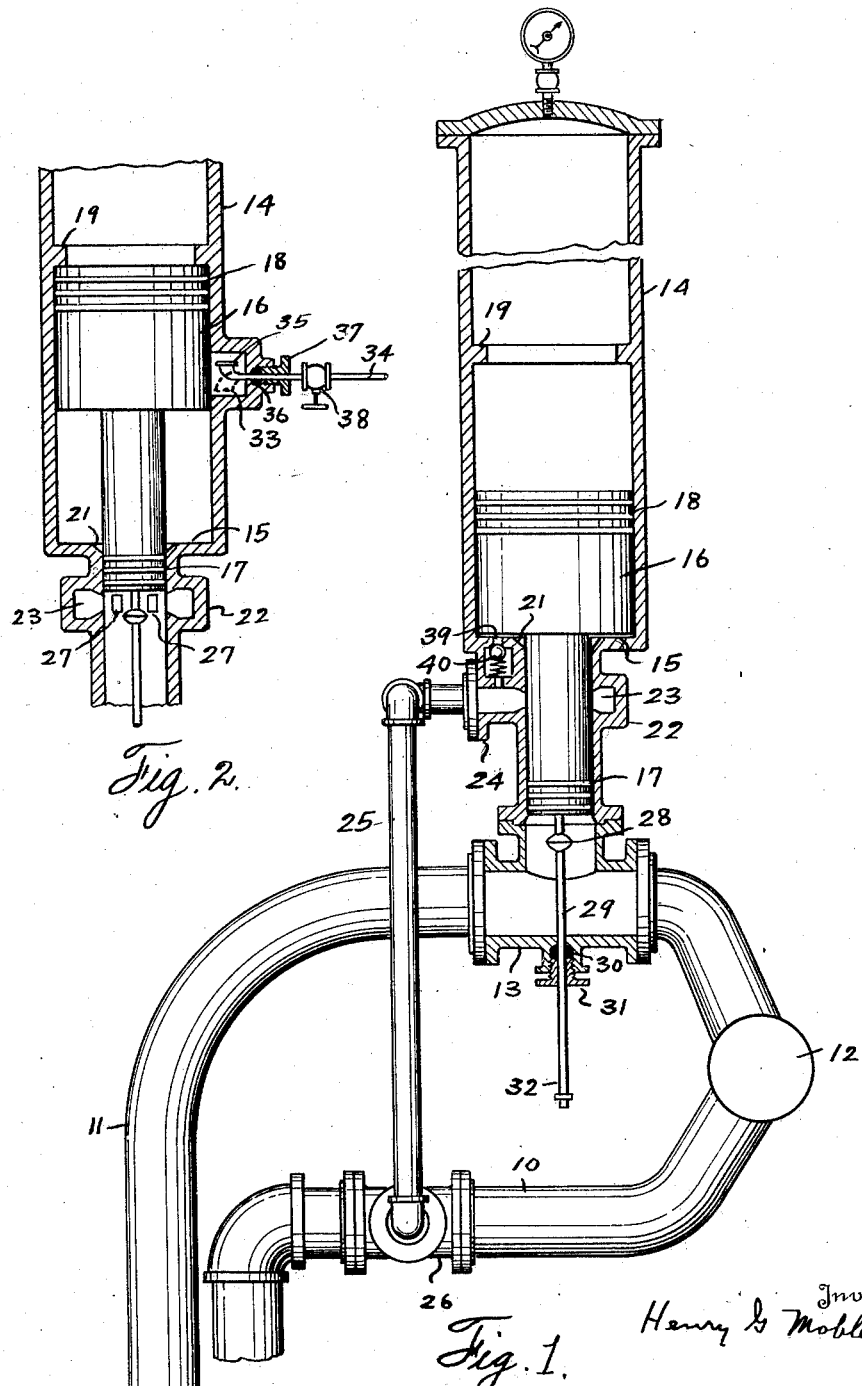

Patented Apr. 15, 1930

1,754,641

UNITED STATES PATENT OFFICE

HENRY G. MOBLEY, OF LEAGUE CITY, TEXAS

PRESSURE-RELIEF APPARATUS

Application filed June 21, 1926. Serial No. 117,220.

This invention relates to new and useful improvements in a pressure relief apparatus specially designed for use on pipe lines.

One object of the invention is to provide an apparatus of the character described having a by-pass between the high and low pressure lines and means automatically controlling said by-pass whereby excessive pressure in the high pressure line may be relieved and damage to the high pressure line thus avoided.

Another object of the invention is to provide an apparatus of the character described embodying a novel type of piston valve exposed to the pressure in the high pressure line and operating against an air cushion, the pressure of which may be varied at will.

A further feature of this invention resides in the provision of a piston valve of novel formation operable in a cylinder and having its end, exposed to the pressure in the high pressure line, of smaller area than the end operating against the air cushion in the cylinder, thus permitting an air cushion of relatively low pressure.

The invention consists of certain improved features over the apparatus described in my co-pending applicaton filed May 24, 1926, under Serial No. 111,441.

With the above and other objects in view this invention has particular relation to certain novel features of construction, operation and arrangement of parts, an example of which is given in this specification and illustrated in the accompanying drawings wherein:—

Figure 1 is a diagrammatic view of a pipe line and pump system, with the automatic pressure relief apparatus in section and with the piston valve in lowermost position, and Figure 2 is an enlarged fragmentary sectional view, showing the piston valve in uppermost position.

Referring now more particularly to the drawings wherein like numerals of reference designate similar parts in each of the figures, the numeral 10 designates the low pressure pipe line, for example, the incoming pipe line for conveying oil in a transcontinental system while the high pressure pipe line 11 is the outgoing pipe leading to the next pumping station, or to the discharge. The line 10 leads directly to the pumping apparatus 12, of any conventional form, adapted for the purpose of receiving oil from the line 10 and delivering it, under increased pressure, to the line 11.

Mounted in the high pressure line 11 is a connecting T 13, which is suitably incorporated into said line with fluid tight joints and into this T there is connected the cylinder 14 of the pressure relief apparatus. The connecting end of this cylinder is of smaller diameter than its outer or free end, thus forming the internal annular shoulder 15. The piston valve 16, correspondingly shaped to the contour of the cylinder, is operable within said cylinder 14 and is provided with the usual packing rings 17 and 18, at its lower and upper ends to form a tight seal with the interior of the cylinder 14.

Spaced from the outer end of the cylinder 14 there is an internal annular flange 19, which serves as a stop to limit the upward movement of the piston valve, and the shoulder 15 constitutes a stop for the piston valve during its downward movement. The inner margin of the shoulder 15 is chamfered, as at 21 so that the piston rings 17 will not hang thereon during the operation of the piston.

A belt 22 is formed integrally with the cylinder 14 and has an annular chamber 23 therein, which communicates, through the hollow flange connection 24, with a by-pass pipe 25 which leads back to the T connection 26 in the low pressure line 10. The passage 23 has a number of ports 27, 27, which open into the interior of the cylinder 14 at such a distance from the lower end thereof and from the flange 19 that they are closed when the piston valve 16 is in its lower position and are uncovered when the piston valve is moved to its upper position, as shown in Figure 2. A ball joint 28 is connected to the lower end of the piston valve and receives a stem 29 which passes through an aperture in the T 13 and to the exterior; this aperture is closed against leakage by the suitable packing 30 having a jam nut 31. The outer end 32 of the stem 29 is suitably graduated and marked so that the distance, or extent, by which its end 32 projects to the exterior is an indication of the position of the piston valve 16, within the interior of the cylinder 14. The ball joint 28 corrects for any slight irregularities in the assembly.

The cavity 33 is formed in the wall of the cylinder 14 a sufficient distance above the ports 27 so that it is always closed by the piston valve 16, in its upper position but is uncovered by this valve when the latter passes into the lower position. A pipe 34 passes through the wall of the cylinder 14 into the recess 33 and its inner end carries an elbow 35 for the purpose of regulating the level of oil within the upper portion of the cylinder 14, as will be hereinafter described.

The pipe 34 passes through the packing 36 and a jam nut 37 which maintains a tight sealing of the pipe with respect to the interior of the cylinder 14. The valve 38 is provided in the line 34 to shut it off at will.

There is a port 39 leading from the chamber 23 up through the shoulder 15 and is provided with a back pressure check valve 40.

The method of operation is as follows:—

The piston valve 16 is drawn down to its lowermost position, that is, with its enlarged portion seated against the shoulder 15, by the pull on the rod 32, if necessary, or in any other suitable manner. At this time the pipe line 11 is substantially without pressure and this operation is easy. A quantity of lubricating oil is then forced in through the pipe 34 and is received on top of the piston valve 16 and in the cavity 33 and thereafter serves to assure tightness of the piston valve 16 within the cylinder 14. Air, under compression, is then forced into the outer portion of the cylinder 14 through this same pipe 34 until a predetermined pressure suitable to maintain a predetermined maximum pressure within the high pressure pipe 11 during operation, is obtained. The pipe 34 is then rotated within the packing 36 and the nut 37 until it is in the position shown in dotted lines in Figure 2; the valve 38 is maintained closed except while the oil or air is being introduced into the cylinder 14. If the low pressure pipe line 10 now deliver oil to the pump 12 and the latter be actuated to force this oil, under pressure, into the high pressure line 11, pressure within this line 11, will build up until the piston valve 16 is forced upwardly against the air pressure in the upper portion of the cylinder 14. This upward movement of the piston 16 will be indicated at the exterior by the movement of the outer end 32 of the rod. When the pipe line 11 is at its maximum predetermined position of safety the piston valve 16 will be suspended within the cylinder 14 at a position in which its lower end barely covers the ports 27; it is maintained in this position by the air pressure above it and by the oil pressure below it and it is apparent that by regulating the air pressure in the upper end of the cylinder 14 the relative pressure within the pipe 11, at which this position of the valve 16 is maintained may be regulated at the will of the operator. The end of the piston valve 16, exposed to the fluid pressure in the line 11, is of much smaller diameter than the opposite end of the piston working against the air pressure and consequently a relatively low air pressure in the outer end of the cylinder 14 will balance the oil pressure in the line 11 and this is one of the advantages sought to be obtained by the form of the apparatus herein described.

If a pressure in excess of this occurs within the pipe line 11 the piston valve 16 will be moved further upward and a portion of the oil contained within the pipe 11 and beneath the piston 16 is permitted to pass through the ports 27 into the annular passage 23 and thence through the by-pass pipe 25 back to the low pressure pipe line 10 whereby any injury or damage to either the pipe line or the pump and engine are avoided.

While the pressure in the line 11 is below maximum the apparatus acts as an alleviator to absorb the shocks or pulsations due to the operation of the pump 12, to a great extent relieving the pressure line 11 of excessive vibration and pressure due to the normal operation of the pump.

As the piston valve 16 rises in the cylinder there will be an annular chamber formed between the annular shoulder 15 and the opposing part of the enlarged end of the piston valve and a partial vacuum will be formed in said chamber and the check valve 40 has been provided to prevent the back flow of fluid through the by-pass pipe 25, but there will be a certain amount of leakage up past the reduced end of the valve 16 into this chamber and as the piston valve 16 moves downwardly toward the line 11, the fluid will be forced out of this chamber through the port 39 and through the by-pass pipe 25, past the check valve 40.

It will be understood that the invention is not limited to the specific embodiment shown, but that it may be modified within the scope of the appended claims.

What I claim is:—

1. In a pressure control system including a low pressure line and a high pressure line, a cylinder connected into said high pressure line and having its outer end enlarged, a floating plunger-like valve in said cylinder, formed to conform to the contour of and to work in said cylinder, a by-pass controlled by said valve and connecting the reduced end of said cylinder into the low pressure line and having a port through which it is also connected into the enlarged end of the cylinder and a check valve controlling said port and arranged to permit the discharge of fluid from said cylinder into said by-pass.

2. In a pressure control system including a low pressure line and a high pressure line; a by-pass connecting said lines, a cylinder connected into said high pressure line and having its inner end reduced, said reduced end forming a portion of said by-pass, a floating valve in said cylinder controlling said by-pass and having its inner end reduced, said valve conforming to the general contour of said cylinder, there being a valve controlled port leading from said by-pass and entering said cylinder between the enlarged portion of the valve and the reduced portion of the cylinder and a valve arranged to permit the discharge of fluid from said cylinder into said by-pass.

3. In a pressure control system including a low pressure line and a high pressure line, a by-pass connecting said lines, a cylinder connected into said high pressure line and having its inner end reduced and formed with an internal annular chambered shoulder, a floating valve fitting closely in said cylinder and controlling said by-pass and having its inner end reduced, said valve conforming to the general contour of said cylinder and its reduced end working through said shoulder, there being a valve controlled port leading from said by-pass and entering said cylinder between the enlarged portion of the valve and the reduced portion of the cylinder, a valve permitting the outward flow of fluid through said port, the reduced end of said valve being exposed to the pressure in said high pressure line and the enlarged end of said valve working against pneumatic pressure in said cylinder.

4. In a pressure control device for a pipe line system including a low pressure feed line and a high pressure delivery line, a cylinder having one end reduced and formed with an internal annular shoulder, the reduced end of said cylinder being connected into, and forming a part of, said high pressure line, a by-pass connecting the reduced end of the cylinder with the low pressure line, a floating relief valve having its inner end reduced and fitted closely in the reduced end of the cylinder and having its outer end enlarged and fitted closely in the large end of the cylinder, said valve being balanced between the liquid pressure in the high pressure line and a pneumatic pressure in the outer end of the cylinder and means for regulating said pneumatic pressure.

5. In a pressure control device for a pipe line system, including a low pressure feed line and a high pressure delivery line, a cylinder having one end reduced and formed with an internal annular shoulder, the reduced end of said cylinder being connected into, and forming part of, said high pressure line, a by-pass connecting the reduced end of the cylinder with the low pressure line, a floating relief valve having its inner end reduced and fitted closely in the reduced end of the cylinder and having its outer end enlarged and fitted closely in the large end of the cylinder, said valve being balanced between the liquid pressure in the high pressure line and a pneumatic pressure in the outer end of the cylinder, means for regulating said pneumatic pressure there being a port leading through said shoulder from the cylinder into said by-pass, a valve controlling said port, and permitting the flow of fluid from the cylinder into the by-pass but preventing the backflow of fluid from the by-pass into the cylinder.

In testimony whereof I have signed my name to this specification.

HENRY G. MOBLEY.